(12) United States Patent
Yamazaki et al.

(10) Patent No.: US 8,106,546 B2
(45) Date of Patent: Jan. 31, 2012

(54) RECIPROCATING VIBRATOR

(75) Inventors: Masami Yamazaki, Ueda (JP); Keisuke Furuichi, Ueda (JP); Hiroki Katou, Ueda (JP)

(73) Assignee: Sanyo Seimitsu Co., Ltd., Ueda-shi (JP)

( * ) Notice: Subject to any disclaimer, the term of this patent is extended or adjusted under 35 U.S.C. 154(b) by 155 days.

(21) Appl. No.: 12/559,049

(22) Filed: Sep. 14, 2009

(65) Prior Publication Data

US 2010/0066182 A1 Mar. 18, 2010

(30) Foreign Application Priority Data

Sep. 16, 2008 (JP) ................................. 2008-236344

(51) Int. Cl.
*H02K 33/00* (2006.01)
(52) U.S. Cl. ........................................... 310/29; 310/15
(58) Field of Classification Search .................... 310/29, 310/17, 30, 15, 12.14, 388.6; 340/388.1, 340/388.5
See application file for complete search history.

(56) References Cited

U.S. PATENT DOCUMENTS

| | | | | |
|---|---|---|---|---|
| 5,682,132 A | * | 10/1997 | Hiroyoshi et al. | 340/407.1 |
| 5,894,263 A | * | 4/1999 | Shimakawa et al. | 340/388.1 |
| 6,777,895 B2 | * | 8/2004 | Shimoda et al. | 318/114 |

FOREIGN PATENT DOCUMENTS

JP 2003-154314 A1 5/2003

\* cited by examiner

*Primary Examiner* — Nguyen N Hanh
(74) *Attorney, Agent, or Firm* — Kratz, Quintos & Hanson, LLP

(57) ABSTRACT

A reciprocating vibrator able to prevent detachment of a spindle even without an outer cover, that is, a vibration linear actuator provided with a ring-shaped weight 20 having a permanent magnet 30, 31 at its inner circumference side, a first plate spring 40 fastened to a first end face 20a of this weight 20 at outer circumference side tail parts 41a, 42a, a second plate spring 50 fastened to a second end face 20b of the weight 20 at outer circumference side tail parts 51a, 52a, and a stator supporting the first and second plate springs 40, 50 and having an excitation coil 60 generating a reciprocating vibrating magnetic field with respect to the weight 20 at an inner circumference side of the permanent magnet 30, 31, wherein the stator further has a metal end plate 70 fastening the second plate spring 50 by the ring-shaped plate part 53.

5 Claims, 7 Drawing Sheets

RECIPROCATING VIBRATOR

CROSS-REFERENCE TO RELATED APPLICATIONS

This application is based upon and claims the benefit of priority of the prior Japanese Patent Application No. 2008-236344, filed on Sep. 16, 2008, the entire contents of which are incorporated herein by reference.

BACKGROUND OF THE INVENTION

1. Field of the Invention

The present invention relates to a reciprocating vibrator used in a mobile phone etc., more particularly relates to a structure of a reciprocating vibrator having a weight reciprocating in a thrust direction.

2. Description of the Related Art

As shown in FIG. 7, a vibration linear actuator 1 disclosed in Japanese Patent Publication (A) No. 2003-154314 is provided with a ring-shaped outer yoke 4 as a weight having a permanent magnet 5 at its inner circumference side, a first plate spring 7 fastened to a first end face 4a of this outer yoke 4 by elastic deformation of an outer circumference side tail part 7a, a second plate spring 6 the same as this first plate spring 7 fastened to a second end face 4b of the outer yoke 4 by elastic deformation of an outer circumference side tail part 6a, and a stator having a coil 2 supporting the first and second plate springs 7, 6 and generating a reciprocating vibrating magnetic field with respect to the outer yoke 4 at an inner circumference side of the permanent magnet 5. The stator is further provided with a plastic base 9 having at its bottom surface power feed lands 11 and having a shaft 8 sticking out from it and an inner yoke 3 on this base 9 having the shaft 8 at its center and also forming a coil bobbin of the coil 2. The inner circumference side 7b of the first plate spring 7 is fit with a first projection 3a of the inner yoke 3, while the inner circumference side 6b of the second plate spring 6 its fit with a second projection 3b of the inner yoke 3 whereby they are clamped between the base 9 and the inner yoke 3.

In the state not feeding power to the coil 2, the outer yoke 4 serving as the weight stops at the illustrated axial direction neutral position where the elastic springback force acting outward to the first end face 4a side due to the first plate spring 7 and the elastic springback force acting outward to the second end face 4b side due to the second plate spring 6 balance, but when the coil 2 is supplied with an alternating current and a reciprocating vibrating magnetic field is formed, the first plate spring 7 and the second plate spring 6 alternately repeat an operation of springing back to a free state of the planar shape, so the outer yoke 4 reciprocates in the thrust direction and generates reciprocating vibration.

Patent Literature 1: Japanese Patent Publication (A) No. 2003-154314 (FIG. 1)

In the above vibration linear actuator 1, the inner yoke 3 is fastened to the shaft 8 by welding etc. and the shaft 8 may be press-fit into a hole of a thick plastic base 9 to make it stand up, so originally the shaft 8 is poor in reliability of fastening. Further, at the top and bottom dead points of the reciprocating vibration of the outer yoke 4, impact like detaching force acts on the shaft 8. For this reason, a metal outer cover (case) 12 is used to cover the inner yoke 3 and outer yoke 4 and is fastened by swaging at the cover swaged parts 12a provided at the base 9. The outer cover 12 also has the role of holding down the shaft 8 and inner yoke 3 from above, but this invites an increase in the number of parts by the amount of the outer cover 12.

SUMMARY OF THE INVENTION

In view of the above problem, an object of the present invention is to provide a reciprocating vibrator able to prevent detachment of the shaft etc. even without an outer cover.

The present invention is a reciprocating vibrator provided with a ring-shaped weight having permanent magnets at its inner circumference side, a first plate spring fastened to a first end face of this weight at outer circumference side tail parts, a second plate spring fastened to a second end face of the weight at outer circumference side tail parts, and a stator supporting the first and second plate springs and having an excitation coil generating a reciprocating vibrating magnetic field with respect to the weight at an inner circumference side of the permanent magnets, wherein the stator further has a metal end plate fastening the second plate spring at its inner circumference side and a thrust member made of a magnetic material passing through the inside of the excitation coil, having two ends passing through a center part of the first plate spring and a hole of the second plate spring, and thrusting against the metal end plate.

The second plate spring is fastened at its inner circumference side to the metal end plate to be integrally joined with it, and the thrust member made of the magnetic material forming the core of the excitation coil passes through the center part of the first plate spring and the hole of the second plate spring and thrusts against the metal end plate, so the thrust member itself will never detach from the first plate spring and therefore so it is possible to eliminate the outer cover (case), reduce the number of parts, and lower the cost. Further, along with the elimination of the need for the outer cover, a metal end plate can be made thinner than a plastic board, so the reciprocating vibrator can also be made thinner. Furthermore, the first plate spring differs from the second plate spring in that it has a center plate part, so this center plate part can be picked up by suction making the reciprocating vibrator suited for automatic mounting.

The thrust member serving as the core may be formed into the shape of a coil bobbin as well, but to reduce the outside diameter dimension of the reciprocating vibrator and reduce the mounting area, it is preferable to make it a spindle and use a cylindrically shaped excitation coil long in the axial direction to secure the ampere turns.

The thrust member preferably has a projection at one end for engaging with a positioning hole of the metal end plate.

When the metal end plate has projecting parts for limited contact and welding with the inner circumference side of the second plate spring, spot welding at the projecting parts becomes easy.

The vibrator preferably has a power feed circuit board supported on the metal end plate and carrying the excitation coil.

BRIEF DESCRIPTION OF THE DRAWINGS

These and other objects and features of the present invention will become clearer from the following description of the preferred embodiments given with reference to the attached drawings, wherein:

FIG. 1A is a perspective view of a vibration linear actuator according to an embodiment of the present invention, while

FIG. 2A is a side view of the same vibration linear actuator, while

FIG. 3A is a plan view of the same vibration linear actuator, while

FIG. 6A is a perspective view of a mover of the same vibration linear actuator seen from the back, while

DESCRIPTION OF THE PREFERRED EMBODIMENTS

Figure 1A:
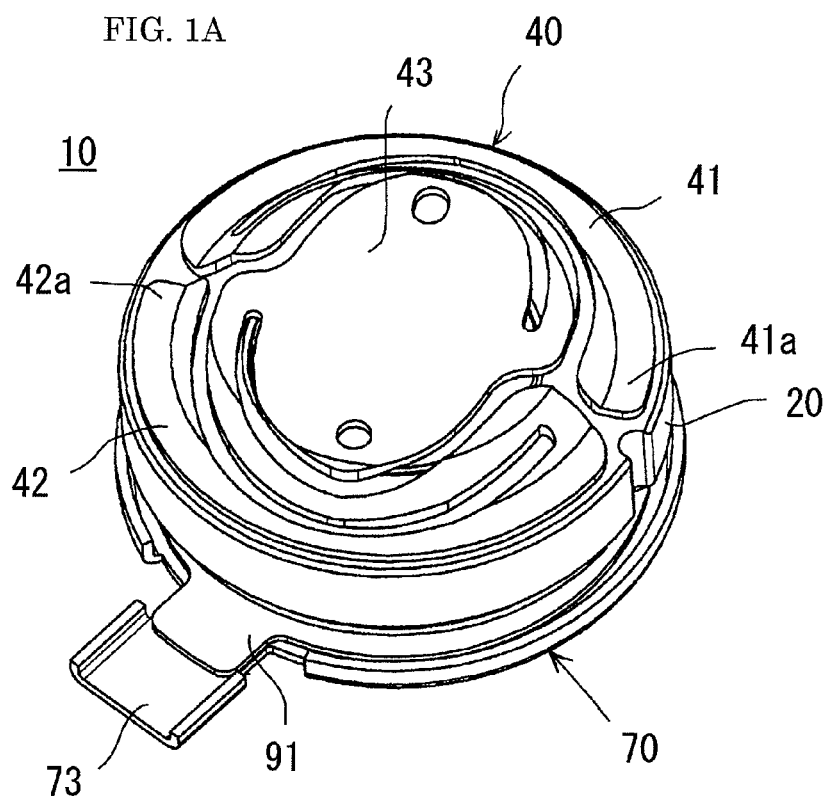
Figure 1B:
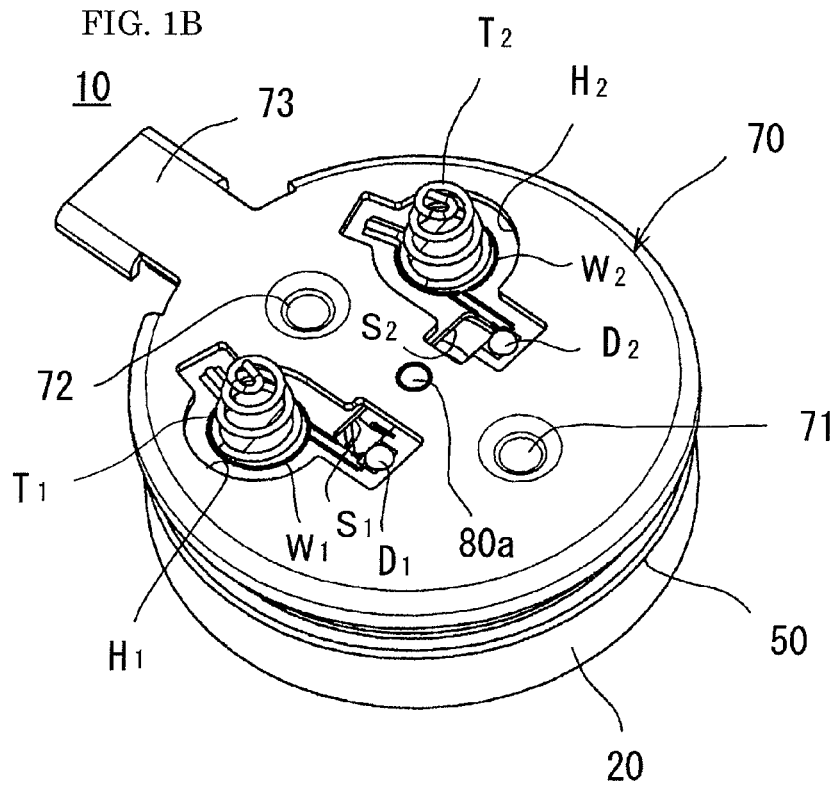
FIG. 1B is a perspective view showing an upside down state of the same vibration linear actuator.
Figure 2A:
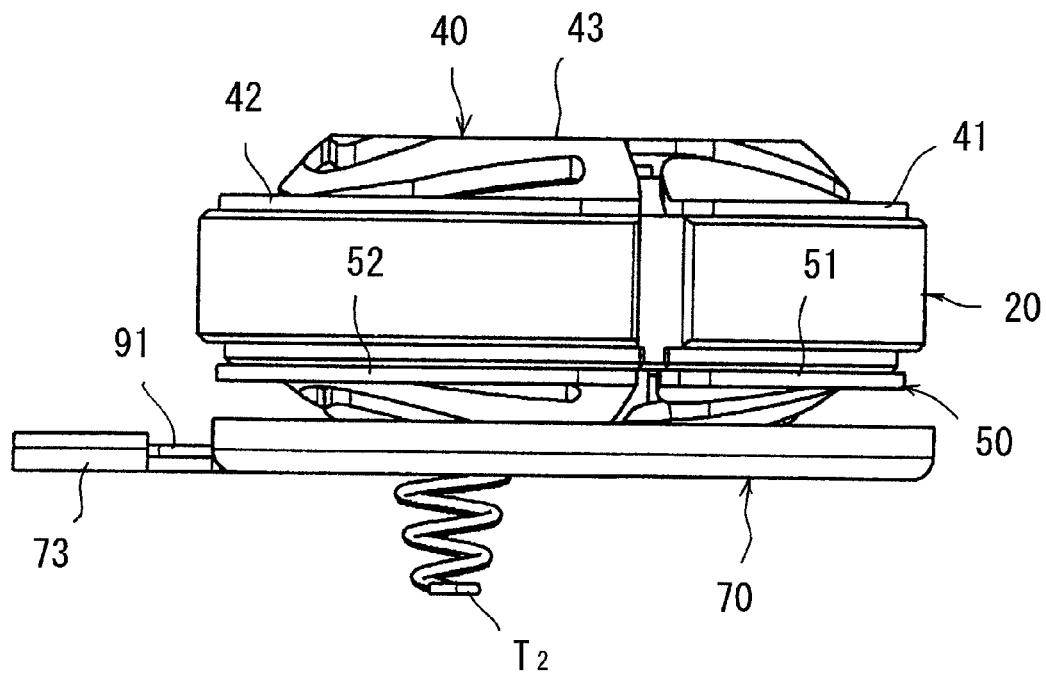
Figure 2B:
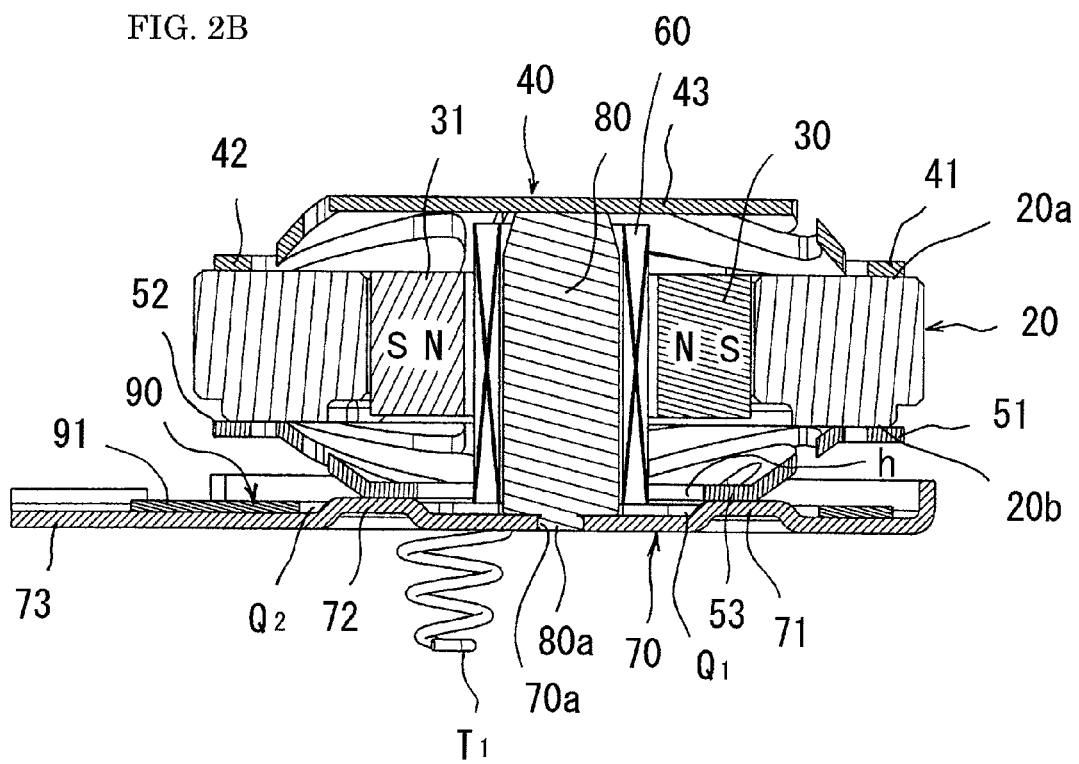
FIG. 2B is a longitudinal cross-sectional side view of the same vibration linear actuator.
Figure 3A:
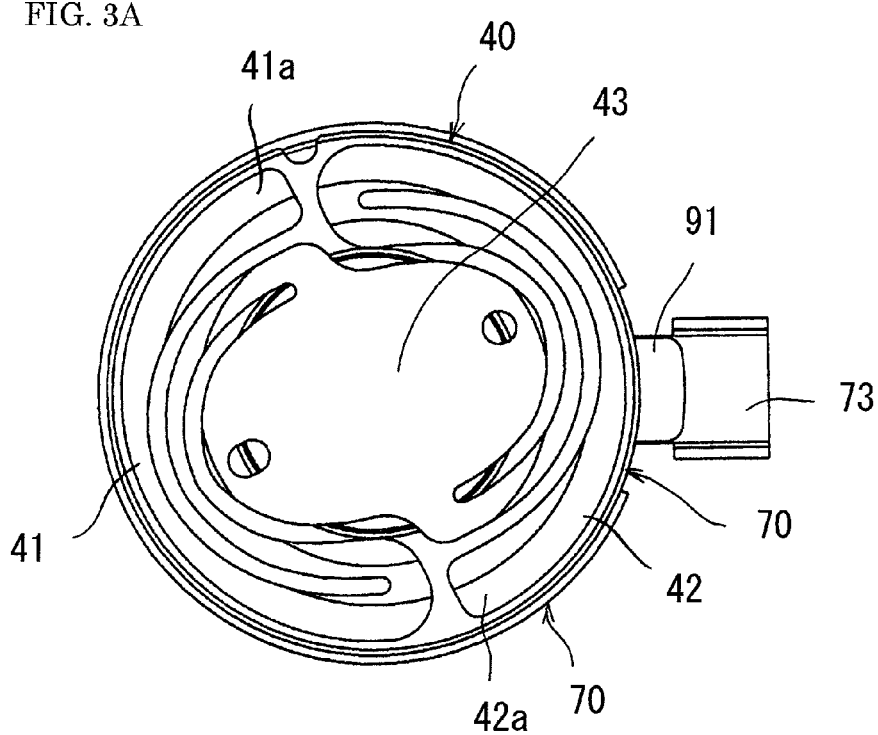
Figure 3B:
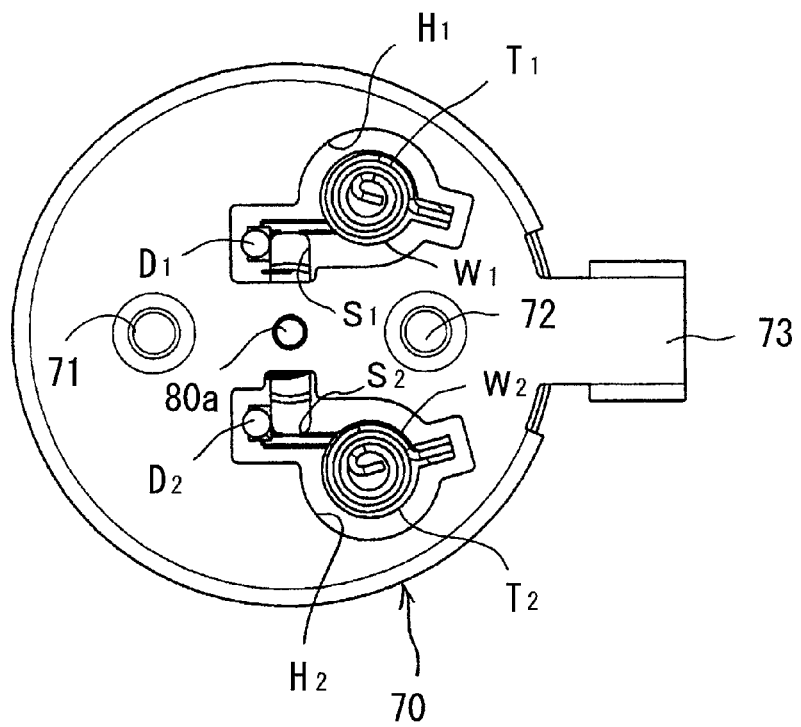
FIG. 3B is a bottom view of the same vibration linear actuator.
Figure 4:
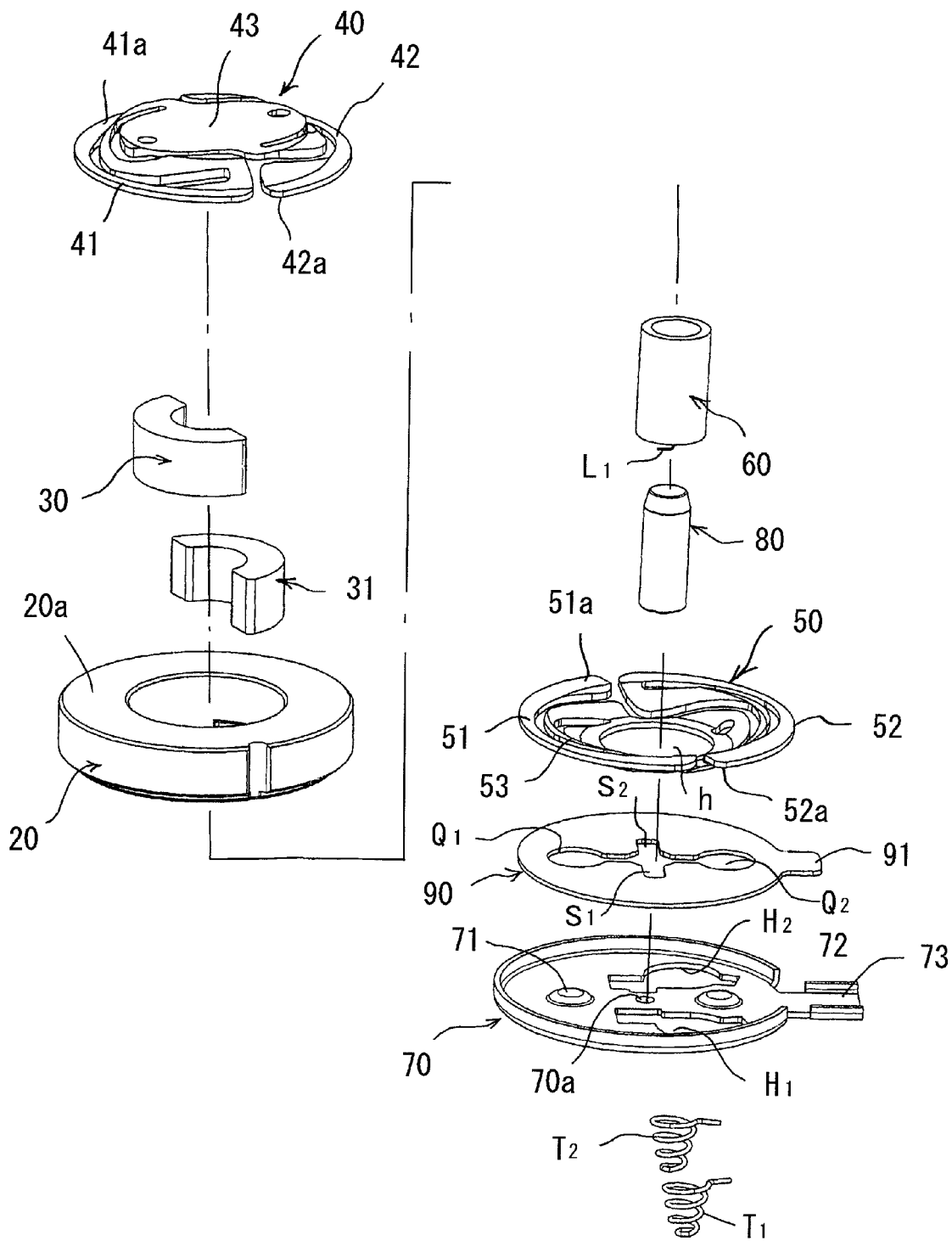
FIG. 4 is a perspective view of the assembly of the same vibration linear actuator seen from above.
Figure 5:
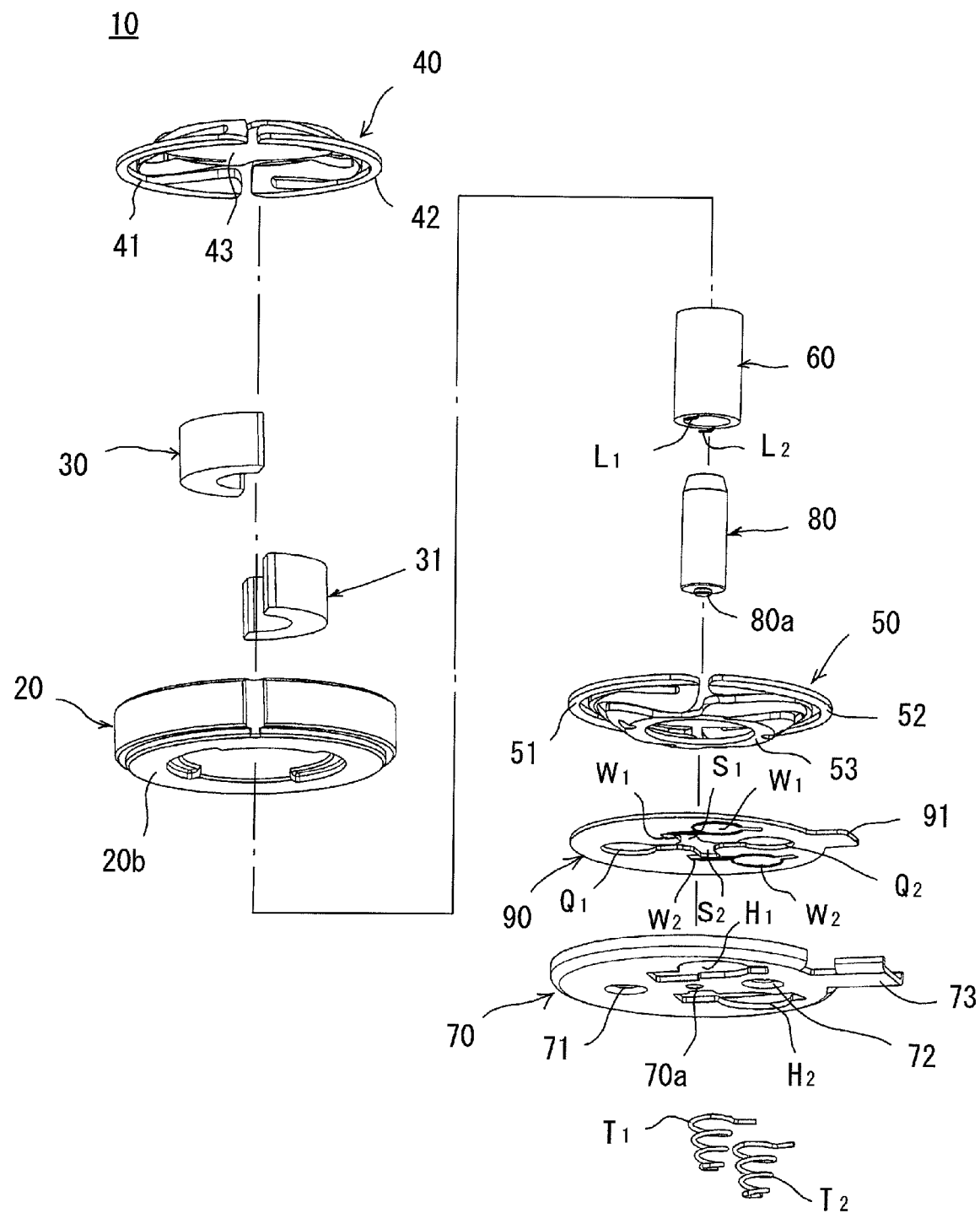
FIG. 5 is a perspective view of the assembly of the same vibration linear actuator seen from below.
Figure 6A:
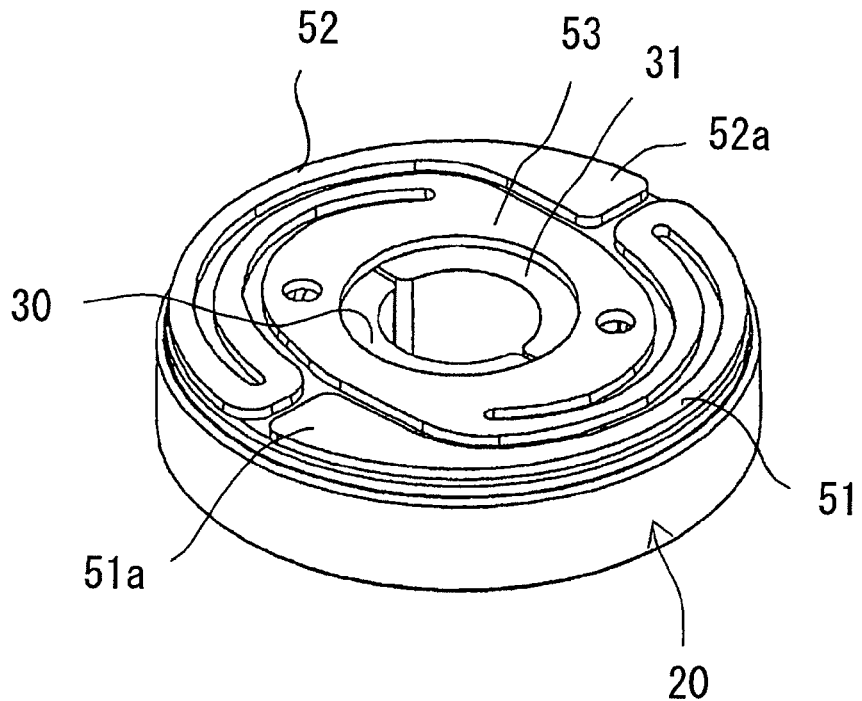
Figure 6B:
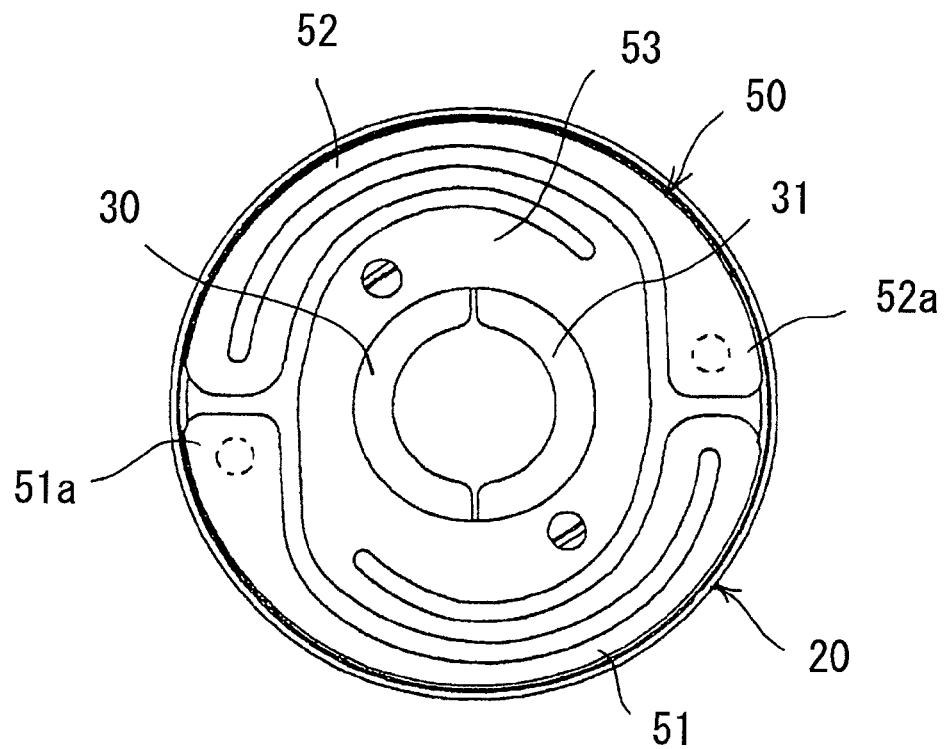
FIG. 6B is a bottom view of the same mover.
Figure 7:
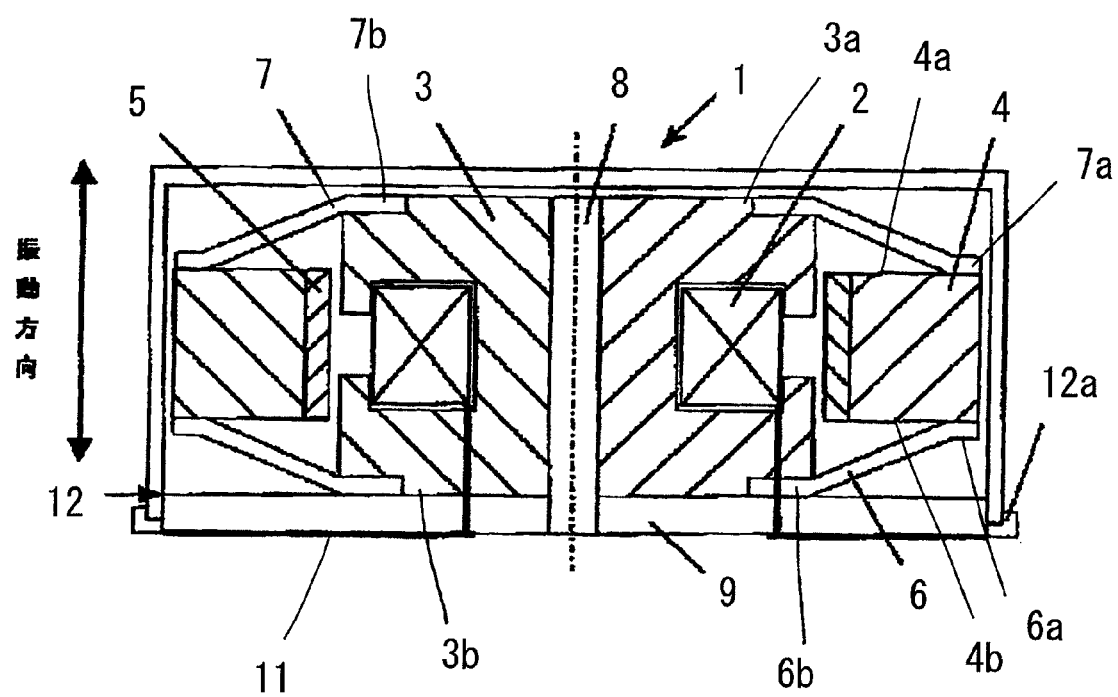
FIG. 7 is a longitudinal cross-sectional side view of a conventional vibration linear actuator.

Next, embodiments of the present invention will be explained with reference to the attached drawings. FIG. 1A is a perspective view of a vibration linear actuator according to an embodiment of the present invention; FIG. 1B is a perspective view showing an upside down state of the same vibration linear actuator; FIG. 2A is a side view of the same vibration linear actuator, FIG. 2B is a longitudinal cross-sectional side view of the same vibration linear actuator; FIG. 3A is a plan view of the same vibration linear actuator; FIG. 3B is a bottom view of the same vibration linear actuator; FIG. 4 is a perspective view of the assembly of the same vibration linear actuator seen from above; FIG. 5 is a perspective view of the assembly of the same vibration linear actuator seen from below; FIG. 6A is a perspective view of a mover of the same vibration linear actuator seen from the back; and FIG. 6B is a bottom view of the same mover.

A vibration linear actuator 10 of this embodiment is provided with a ring-shaped weight 20 as a mover, parallel magnetizing semi-ring-shaped permanent magnets 30, 31 fit at an inner circumference side of this weight in a state with the same magnetic poles facing each other, a first plate spring 40 fastened to a first end face 20a of the weight 20 by spot welding at outer circumference side tail parts 41a, 42a, a second plate spring 50 fastened to a second end face 20b of the weight 20 by spot welding at outer circumference side tail parts 51a, 52a, and a stator supporting the first and second plate springs 40, 50 and having a cylindrical excitation coil 60 generating a reciprocating vibrating magnetic field with respect to the weight 20 at the inner circumference side of the semi-ring-shaped permanent magnets 30, 31.

As shown in FIG. 4, the first plate spring 40 has folded back elastic pieces 41, 42 extending from 180° rotationally symmetrical positions of an outer circumference side of a center plate part 43. The second plate spring 50 has folded back elastic pieces 51, 52 extending from 180° rotationally symmetrical positions of an outer circumference side of a ring-shaped plate part 53. The stator has, other than the excitation coil 60, a dish shaped metal end plate 70 fastened by the ring-shaped plate part 53 of the second plate spring 50, a spindle 80 made of a magnetic material passing through the inside of the excitation coil 60, having two ends passing through a center plate part 43 of the first plate spring 40 and a center hole h of the second plate spring 50, and thrusting against a center part of the metal end plate 70, and a printed circuit board 90 supported on the metal end plate 70 and carrying the excitation coil 60.

The metal end plate 70 has projecting parts 71, 72 for spot welding from the back side near 180° symmetrical positions of the ring-shaped plate part 53 of the second plate spring 50, a projecting piece 73 receiving a protruding piece 91 of the printed circuit board 90, terminal through holes $H_1$, $H_2$ for soldering spiral shaped coil spring terminals $T_1$, $T_2$ to power feed patterns $W_1$, $W_2$ formed on the back surface of the flexible circuit board 90, and a positioning hole 70a in which a projection 80a projecting out from a bottom end of the spindle 80 fits. The printed circuit board 90 has two round holes $Q_1$, $Q_2$ into which the projecting parts 71, 72 fit and coil terminal end through holes $S_1$, $S_2$ perpendicularly intersecting a straight slot connecting these round holes $Q_1$, $Q_2$ for soldering coil terminal ends $L_1$, $L_2$ of the excitation coil 60 to parts $w_1$, $w_2$ of the back surface power feed patterns $W_1$, $W_2$ by solder bumps $D_1$, $D_2$.

The excitation coil 60 is mounted on a printed circuit board 90. The coil terminal ends $L_1$, $L_2$ are hooked at the rims of the coil terminal end through holes $S_1$, $S_2$ and soldered to parts of $w_1$, $w_2$ of the power feed patterns $W_1$, $W_2$. The spindle 80 of the magnetic material is mounted on the metal end plate 70 through the center of the coil terminal end through holes $S_1$, $S_2$ of the printed circuit board 90. The projection 80a is fit into the positioning hole 70a.

Note that in the present embodiment, the vibration linear actuator 10 is mounted on a printed circuit board in a mobile phone where the excitation coil 60 can be fed power through the coil spring terminals $T_1$, $T_2$ and the power feed patterns $W_1$, $W_2$, but by changing the power feed patterns $W_1$, $W_2$ of the flexible circuit board 9, it is possible to feed power to the excitation coil 60 without using the coil spring terminals $T_1$, $T_2$.

In the state where no power is being fed to the excitation coil 60, the weight 20 stops at the axial direction neutral position shown in FIG. 2(B) where the elastic springback force acting outward of the first end face 20a due to the elastic deformation of the first plate spring 40 and the elastic springback force acting outward of the second end face 20b due to the elastic deformation of the second plate spring 50 balance, but when the excitation coil 60 is supplied with alternating current and a reciprocating vibrating magnetic field is formed, the first plate spring 40 and second plate spring 50 alternately repeat an operation of springing back to a free state of the planar shape, so the weight 20 reciprocally moves in the thrust direction and generates reciprocal vibration.

In this example, the second plate spring 50 is fastened at its ring-shaped plate part 53 to the metal end plate 70 to be integrally joined with it. The spindle 80 made of the magnetic material forming the core of the excitation coil 60 forms a thrust member passing through the center plate part 43 of the first plate spring 40 and the center hole h of the second plate spring 50 to thrust against the metal end plate 70, so the spindle 80 will never detach from the first plate spring 40 and therefore no outer cover need be used, the number of parts can be reduced, and the cost can be lowered. Further, along with the elimination of the need for the outer cover, the metal end plate 70 can be made thinner than a plastic board, so the vibration linear actuator 10 can also be made thinner. Furthermore, the first plate spring 40 differs from the second plate spring 50 in that it has a center plate part 43, so this center plate part 43 can be picked up by suction making the vibration linear actuator 10 suited for automatic mounting.

The excitation coil 60 is cylindrical and long, so the outside diameter dimension can be reduced and the ampere turns secured. Further, it does not have any coil bobbin, so the coil terminal ends $L_1$, $L_2$ of the bottom end can be connected as they are to the power feed patterns $W_1$, $W_2$ of the flexible circuit board 90.

Note that in the present embodiment, only the bottom end of the spindle 80 is provided with a projection 80a, but the top end may also be provided with a projection for fitting into a positioning hole formed in the center plate part 43 of the first plate spring 40.

Summarizing the advantageous effects of the present invention, the present invention uses a first plate spring of a different shape from the second plate spring. The second plate spring is fastened at its inner circumference side to a metal end plate to be integrally joined with it. The thrust member made of the magnetic material forming the core of the excitation coil passes through the center part of the first plate spring and the hole of the second plate spring and thrusts against the metal end plate, so the thrust member will never detach from the first plate spring and therefore the outer cover can be eliminated.

While the invention has been described with reference to specific embodiments chosen for purpose of illustration, it should be apparent that numerous modifications could be made thereto by those skilled in the art without departing from the basic concept and scope of the invention.

The invention claimed is:

1. A reciprocating vibrator comprising a ring-shaped weight having permanent magnets at its inner circumference side, a first plate spring fastened to a first end face of this weight at outer circumference side tail parts, a second plate spring fastened to a second end face of the weight at outer circumference side tail parts, and a stator supporting the first and second plate springs and having an excitation coil generating a reciprocating vibrating magnetic field with respect to the weight at an inner circumference side of the permanent magnets, said stator further comprising a metal end plate fastening the second plate spring at its inner circumference side, and a thrust member made of a magnetic material, said thrust member passing through the inside of the excitation coil, having one end protrude as to abut a center part of the first plate spring and a second end pass through a hole of the second plate spring, the second end thrusting against the metal end plate.

2. A reciprocating vibrator as set forth in claim 1, wherein said thrust member is a spindle and said excitation coil is cylindrically shaped.

3. A reciprocating vibrator as set forth in claim 1, wherein said thrust member has a projection at one of its ends for engaging with a positioning hole of said metal end plate.

4. A reciprocating vibrator as set forth in claim 1, further having a power feed circuit board supported on said metal end plate for carrying said excitation coil.

5. A reciprocating vibrator comprising a ring-shaped weight having permanent magnets at its inner circumference side, a first plate spring fastened to a first end face of this weight at outer circumference side tail parts, a second plate spring fastened to a second end face of the weight at outer circumference side tail parts, and a stator supporting the first and second plate springs and having an excitation coil generating a reciprocating vibrating magnetic field with respect to the weight at an inner circumference side of the permanent magnets, said stator further comprising a metal end plate fastening the second plate spring at its inner circumference side, and a thrust member made of a magnetic material, said thrust member passing through the inside of the excitation coil, having one end protrude as to abut a center part of the first plate spring and a second end pass through a hole of the second plate spring, the second end thrusting against the metal end plate, wherein said metal end plate has projecting parts for limited contact and welding with an inner circumference side of said second plate spring.

* * * * *